United States Patent Office 3,033,667
Patented May 8, 1962

---

3,033,667
COMPOSITION AND METHOD FOR
DEFOLIATING PLANTS
Francis X. Markley, Ferndale, Mich., assignor, by mesne
assignments, to Pittsburgh Coke and Chemical Company, a corporation of Pennsylvania
No Drawing. Filed May 9, 1957, Ser. No. 658,025
10 Claims. (Cl. 71—2.3)

This invention relates to the defoliation of crops, to the preparation of agricultural plants for harvesting, and to forced maturing. This invention also relates to control of economic pests by altering the life-cycle of botanical hosts.

It has been recognized for many years that in order to reap the optimum crop from a large variety of plants, in particular those plants of luxuriant growth yielding a crop which is field-harvested, it is desirable to alter the growth of these non-harvestable, functional organs of the plant in order to render accessible, or hasten the maturity of, the harvestable portions.

It is well known that during the normal life process of a herbaceous plant, the leafy portions drop as a result of changes in a group of specialized cells at the base of the petiole. The outward effect is the result of development of an abscission layer composed of meristematic cells developed across the base of the petiole. The mechanism of these changes is essentially little understood, but a number of external, naturally occurring factors are known to produce this inner growth effect. For example, in certain species, a decrease in ambient temperature at the proper period in the life cycle of the plant causes the natural formation of the abscission layer. Likewise, an injury, through disease or adverse growing conditions, will be conducive to such abscission layer, resulting in the sloughing-off by the plant of the injured member. A number of additional causes of natural origin, or abnormally imposed by nature on the plant, bring about defoliation. In the past, it has been proposed to effect defoliation by applying to the plants chemicals having herbicidal activity. However, application of such destructive material has failed to provide defoliants of commercial significance. When such materials are applied, a variety of effects may result, any one of which interferes with the normal harvesting of a crop. For example, herbicides of the hormonal type cause epinasty of the plant without prompt defoliation and renders difficult, or even impossible, machine harvesting. Other herbicidal chemicals cause a general wilting condition so that the plants do not remain upright, again interfering with mechanical harvesting. Still other herbicidal chemicals have been suggested as cotton defoliants but suffer from the disadvantage that desiccation at the low dosages preferred for cotton defoliation occurs. Desiccated cotton plants do not permit harvesting of the commercial portions of the plant without removing in the same operation the desiccated leaves. In general, when plant desiccation occurs, the leaves tend to freeze on the plant and frequently cannot even be removed prior to harvest by shaking or mechanically contacting the plant.

In addition to the disadvantages illustrated above of applying herbicidal chemicals in the usual fashion to plants for defoliant purposes, secondary effects of an undesirable nature are produced. In addition, certain materials have been proposed as defoliants which are not herbicidal but suffer from the serious disadvantage of being non-adherent, or removed by weathering, resulting in the necessity of repeated and costly applications. Such materials must be applied during a limited and critical period during the growing season to achieve any success whatsoever.

The present invention has for an object the provision of formulations and methods effective in causing defoliation without exerting a general herbicidal action to the crop. A further object of our invention is the provision of materials and methods for preparing agricultural crops for the harvest. A further object is to control pest infestation by altering the life-cycle of hosts for such agricultural pests. Likewise, it is an object of my invention to provide compositions which enhance the value of agricultural crops, hasten the muturity thereof, and permit optimum harvest to be obtained. Still further objects will be apparent from the further description of our invention hereinafter.

The defoliation and the resulting improvement in crop value and indirect control of pest infestation is achieved by applying bioregulant compositions containing aryl thionophosphates in combination with surface contacting agents directly to the foliage of the plant.

In general, the active ingredient of these compositions can be expressed by the general formula

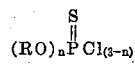

$$(RO)_n P Cl_{(3-n)}$$

wherein $n$ is a whole number from 1 to 2 and the group R are aryl radicals. Furthermore, when $n$ is 2, the groups $(RO)_n$ can be the same or different. Thus, the active ingredients of these compositions are selected from the group consisting of diaryl monochlorothionophosphates and aryl dichlorothionophosphates. The foregoing nomenclature is in accordance with Kosolapoff, "Organic Phosphorous Compounds," Wiley, 1950. In general, the aryl groups providing effective defoliants in these novel compositions comprise mononuclear and dinuclear carbocyclic radicals. In addition to the phenyl and naphthyl radicals, certain preferred classes of the active defoliants of this invention comprise alkyl substituted phenyl and naphthyl radicals, and chloro-substituted phenyl and naphthyl radicals. In general, when the aryl radicals of the active ingredient of this invention are substituted with alkyl groups, it is preferred to employ one or two alkyl groups in the meta and para positions when chloro-substituted aryl groups are present in the active ingredient of these compositions, it is preferred that there be no more than three chlorine atoms in any one aryl radical and that these be in the meta or para position. Among the alkyl substituents of the aryl radicals as above, it is preferred to employ those having one to about eight carbon atoms, that is, the lower alkyl radicals. In particular, the aryl groups in the active ingredient of this invention can be substituted with methyl, ethyl, propyl, amyl, hexyl, heptyl, and octyl groups and the branched chain isomers thereof.

Among the classes of aryl thionophosphates encompassed by the compositions of this invention in addition to the foregoing description thereof, it is preferred to employ the diaryl monochlorothionophosphates. Nearly comparable in activity, and having some secondary properties superior thereto, are the monoaryl dichlorothionophosphates.

Typical examples of the diaryl monochlorothionophosphates, of this invention include diphenyl chlorothionophosphate,
di(α-naphthyl)chlorothionophosphate,
di(o-cresyl)chlorothionophosphate,
di(m-cresyl)chlorothionophosphate,
di(p-cresyl)chlorothionophosphate,
the di(methylphenyl)chlorothionophosphates,
the di(ethylphenyl)chlorothionophosphates,
the di(propylphenyl)chlorothionophosphates,
the di(butylphenyl)chlorothionophosphates,
the di(amylphenyl)chlorothionophosphates, the di(hexylphenyl)chlorothionophosphates,
the di(heptylphenyl)chlorothionophosphates,
the di(octylphenyl)chlorothionophosphates,
phenyl-m-cresyl chlorothionophosphate,
o-cresyl-α-naphthyl chlorothionophosphate,
di(p-chlorophenyl)chlorothionophosphate,
di(2,4-di-chlorophenyl)chlorothionophosphate,
di(2,3,4-trichlorophenyl)chlorothionophosphate,
phenyl-2,4-dichlorophenyl chlorothionophosphate,
di(3-chloro-4-methylphenyl)chlorothionophosphate, and the like.

Among the monoaryl dichlorothionophosphates can be included for illustrative purposes, phenyl dichlorothionophosphate,
o-cresyl dichlorothionophosphate,
m-cresyl dichlorothionophosphate,
p-cresyl dichlorothionophosphate,
2,4-dimethylphenyl dichlorothionophosphate,
3-chloro-4-methylphenyl dichlorothionophosphate,
the ethylphenyl dichlorothionophosphates,
the propylphenyl dichlorothionophosphates,
the butylphenyl dichlorothionophosphates,
the amylphenyl dichlorothionophosphates,
the hexylphenyl dichlorothionophosphates,
the heptylphenyl dichlorothionophosphates,
the octylphenyl dichlorothionophosphates,
α-naphthyl dichlorothionophosphate,
β-naphthyl dichlorothionophosphate, the methyl- and the chloro-naphthyl dichlorothionophosphates and the like.

One of the advantages of the defoliant compositions of this invention resides in the fact that the conditions existing at the time of or after application are of secondary significance. For example, various inorganic or water soluble defoliant compositions have been suggested. Among these are water soluble fluorides, chlorates and hypochlorites, sulfamic derivatives, cyanamides and chlorinated phenols and salts thereof. In order to obtain any degree of defoliation with the above-mentioned defoliants it is ordinarily desirable to apply them under such atmospheric conditions that surface moisture is deposited on the leaf to aid in intimate contacting of the active ingredient with the leaf surface. Obviously the limits of humidity within which such compositions are effective is narrow and excessive moisture would cause the materials to be washed off the plant surface before effective defoliation could occur. Such dependence on nature's whims seriously limits the applicability of the practice of defoliation, as the important variable to consider is the state of growth of the plant. The materials comprising the defoliants of this invention withstand the weathering effects of moisture and furthermore possess the advantage that they can be applied either to the dry leaf surface or to a leaf surface which has already been moistened by rain or dew. In either event effective bioregulation will take place and our method is largely independent of ambient atmospheric conditions.

Organic phosphates have received considerable attention in the past and more recently have been suggested as insecticides. Indeed, one of the principal advantages of the phosphorus-containing insecticides, in addition to their universality, is their low phytotoxity permitting their application at effective dosage levels on growing agricultural crops without damage thereto. In this regard, it is interesting to note that materials closely related to the foregoing ingredients of the compositions of this invention have been suggested for this use. Among these may be exemplified the dialkyl chloroaryl thiophosphates, as disclosed in U.S. Patents Nos. 2,599,512, 2,599,516, 2,599,375 and 2,599,515, the dialkyl chlorothiophosphates as shown in U.S. 2,663,723, the trialkyl phosphates of U.S. 2,552,325 and the O,O-dialkyl O-alkylmercaptoalkyl thiophosphates in U.S. 2,571,989. This last class is of particular interest in connection with the foregoing as they have been suggested as systemic insecticides which inherently must be non-phytoregulatory. In contrast, certain trivalent organic phosphorus compounds, for example, the triisooctyl phosphites of U.S. 2,722,479, are effective preemergence herbicides. It will be noted that none of the materials disclosed in the art discussed hereinabove contains all the essential ingredients of the materials of this invention as shown by the foregoing formula and which are effective by virtue of their combination with properly selected surface contacting agents.

By practicing the present invention, arylchlorothionophosphates are applied so that while there is no general herbicidal action, a specific defoliant action can be obtained. The method of control is dependent upon preparation of non-herbicidal formulations of appropriate concentrations of active ingredient and application thereof to the selected crop at a controlled dosage level. For purposes of defoliation, the active ingredient is present between the limits of between about 0.1 and 10 weight percent in the finished formulation. In order to achieve defoliation of such crops as cotton, soy bean, and the like, the formulations of this invention are employed at a rate of between about 0.5 and 3 pounds of active ingredient per acre. Under unusual concentrations, this upper limit may be increased to 4 pounds per acre but at such concentrations with cotton crops, there is a slight tendency of burning the crop or freezing the leaves with consequent lessened results in defoliation. With short varieties of cotton it is preferred to employ between about 0.5 and 1.5 pounds of active ingredient per acre and with the tall growing varieties between about 1.5 and 3 pounds per acre. In general, for most purposes, satisfactory results are obtained when the arylchlorothionophosphates are formulated in non-herbicidal aqueous emulsions containing a surface active agent at concentrations of 0.1 to 10 weight percent and are applied at a dosage rate of between about 1 and 2 pounds per acre.

Thus, improvement in commercially important agricultural crops while standing in the field can be achieved by practicing this invention by applying non-herbicidal formulations of arylchlorothionophosphates thereto at a rate of 0.5 to 4, preferably 0.5 to 3, pounds per acre.

In order to achieve the non-herbicidal defoliant activity of this invention, the arylchlorothionophosphates are compounded with non-herbicidal surface active agents and non-herbicidal carriers. In certain instances, the dispersing property is obtained by the carrier and in such instances, the term surface-active agent is used to describe the carrier. For most applications, a liquid formulation is preferred. The preferred non-herbicidal carriers which can be employed comprise aliphatic hydrocarbons, and ethers of polyhydric alcohols. Typical examples of the aliphatic hydrocarbons which are suitable for providing the non-herbicidal formulations of this invention are included refined mineral oils, petroleum hydrocarbon fractions having not more than 5 percent olefins and not more than 10 percent aromatic hydrocarbons, white oil, heavy alkylate, and in general, alkyl or cycloalkyl hydrocarbons having between about 6 and 20 carbon atoms. The ethers of polyhydric alcohols suitable as non-herbicidal carriers in the formulation of this invention include the dimethyl ether of diethylene glycol, and the corresponding diethers of polyethylene glycols such as, for example, hexamethylene glycol, tetramethylene glycol, and the like. In general, it is preferred in this embodiment of the formulations of this invention, to employ diethers containing from 1 to about 6 carbon atoms in the aliphatic radicals and from 2 to about 12 carbon atoms in the polyhydric radicals and such polyhydric radicals can contain in the chain one or more ether linkages up to about 6.

When employing the non-herbicidal carriers illustrated above in the formulations of this invention, non-herbicidal surface active agents are likewise employed so as to provide in the ultimate aqueous formulation a well-emulsified mixture suitable for crop application. In general, the common surface active agents of the type of soaps and synthetic detergents are non-herbicidal when employed in the concentrations required to achieve formulations that are satisfactory for this invention. In general, such surface active agents are employed in amounts between about 0.1 to 5.0 parts per 100 parts of active ingredient. Typical of such ingredients are salts of the alkyl and alkylaryl sulfonates, such as the sodium salt or sulfonated ethyl oleate; the sodium salt of sulfonated oxidized petroleum oils; sodium decylbenzene sulfonate; potassium dodecylbenzene sulfonate; the sodium salt of sulfonated ethyl oleylamide; alkyl sulfates, such as sodium lauryl sulfate, sodium oleyl sulfate, ammonium ricinoleyl sulfate, and the like; alkylaryl polyether alcohols, such as alkyl phenoxy polyethoxyethanol wherein the alkyl can be $C_1$ to $C_{20}$, the condensation product of ethylene oxide and alkylated cresol, and polyoxyethylene thioether; fatty acid esters of polyhydric alcohols, such as mannitol monolaurate, and sorbitan monooleate; and the ethylene oxide addition products of such esters, such as the polyoxyethylene derivatives of sorbitan monooleate, and the like.

The arylchlorothionophosphates of this invention are prepared by methods adequately described in the literature, for example, Kosolapoff referred to above. One convenient procedure comprises reacting three molar equivalents of the appropriate phenol with two molar equivalents of thiophosphoryl chloride in the presence of excess base to provide, for the most part, the monosubstituted and disubstituted derivatives and, additionally, traces of the trisubstituted derivative. Thus, for example when 282 parts of phenol are reacted with 338 parts of thiophosphoryl chloride at room temperature in the presence of 150 parts of sodium hydroxide as a 10 percent aqueous solution to obtain the products phenyldichlorothionophosphate and diphenylchlorothionophosphate in high yields and purity. It is advantageous for some applications of the formulations of this invention to employ mixtures of the mono- and di-substituted derivatives without further separation.

In general the active ingredients of this invention will be clear oily materials which can be purified by solvent extraction. The materials are in general hydrolytically stable and, therefore, can be separated from the undesirable acidic impurities by treatment with caustic.

In the illustrative examples which follow, unless otherwise specified, all parts and percentages are by weight.

*Example I*

To 100 parts of mineral oil is added diphenylchlorothionophosphate in the amount of 5 parts. A composition suitable for application is made from this concentrate by further diluting with the oil to a final thiophosphate concentration of 0.5 weight percent. When applied to cotton plants, the above formulation exhibits effective defoliation.

Likewise, similar oil formulations of bis(3-tolyl)chlorothionophosphate,
bis(4-octylphenyl)chlorothionophosphate,
1,4-isopropylbiphenylyl-3-tolyl chlorothionophosphate,
4-chlorophenyl dichlorothionophosphate,
7-hexyl-1-naphthyl-4-biphenylyl chlorothionophosphate,
1-anthryl dichlorothionophosphate and the like can be prepared. Other oils, such as kerosene, toluene, xylene, cumene, etc., can be used with good results, and these oil formulations can have incorporated within them surface-active agents such as those illustrated below.

For certain applications the defoliant compositions of this invention are preferably employed suspended in the conditioning agent. Such suspensions can be made by one of the following methods. A concentrated oil solution of the active ingredient is prepared, and this is added to water containing a dispersing agent; a solution of one of the defoliants in a water-soluble solvent is prepared which is thereupon added to water containing a dispersing agent; or a water suspension of the defoliant is prepared and added to an oil in the presence of a dispersing agent. Thus, a water and oil emulsion of the active ingredient can be prepared. Examples of typical dispersing agents which can be employed in forming dispersions include salts of the alkyl and alkylaryl sulfonates, such as the sodium salt of sulfonated ethyloleate, the sodium salt of sulfonated oxidized petroleum oils, dioctylsodium sulfosuccinate, sodium decylbenzene sulfonate, potassium dodecylbenzene sulfonate, and the sodium salt of sulfonate ethyloleylamide; alkyl sulfates, such as sodium lauryl sulfate, sodium oleyl sulfate, ammonium ricinoleyl sulfate, and the like; alkylaryl polyether alcohols, such as alkyl phenoxy, polyethoxyethanol (alkyl can be methyl to $C_{20}$), the condensate of ethylene oxide and alkylated cresol, polyoxyethylene thioether and the like; fatty acid esters of polyhydric alcohols, such as mannitol monolaurate, sorbitan monooleate, and the like; and the ethylene oxide addition products of such esters, such as the polyoxyethylene derivative of sorbitan monooleate, etc.

The following examples typify methods of preparing the above formulations.

*Example II*

A formulation of phenyldichlorothionophosphate is prepared by intimately admixing 10 parts of this material with 90 parts of water containing 0.1 part of polyoxyethylene thioether. Ten parts of this aqueous suspension is thereupon added to 190 parts of T–942–B oil to form a final formulation consisting of 0.5 weight percent of active ingredient in an oil-in-water emulsion containing a surface-active agent. This material in its final dilution is an effective cotton defoliant.

Equally good oil and water emulsions having high defoliant activity are similarly prepared from the following materials: bis(3-naphthyl)chlorothionophosphate, 3-tolyl-1-naphthylchlorothionophosphate, (3,5-di-ethylphenyl)-(3,5-dichlorophenyl)chlorothionophosphate, bis(4,8-diisopropyl-1-naphthyl)chlorothionophosphate, 2-heptylphenyldichlorothionophosphate, 4-chloro-1-naphthyldichlorothionophosphate, bis(4-isoamyl - 4' - biphenylyl)chlorothionophosphate, and the like.

*Example III*

A 10 percent solution of (1-naphthyldichlorothionophosphate) is prepared in methyl alcohol, and the resulting solution is added to 100 parts of water containing 1 part of sodium lauryl sulfate to provide an aqueous suspension comprising 1 percent of the active ingredient in an alcohol-water mixture.

In a similar manner are prepared such suspensions of diphenylchlorothionophosphate, phenyldichlorothionophosphate, 3-methylphenyldichlorothionophosphate, 3,-6,9-trichloro - 1 - naphthyldichlorothionophosphate, 4-octyl-3-biphenylyldichlorothionophosphate, and similar materials with equal effectiveness. Other organic solvents which may be used in such formulations include Carbitol, Cellosolve, methyl Cellosolve, acetone, isophorone, methylisobutyl ketone, methylethyl keton, isopropanol, and the like. A variety of surface-active agents of the type illustrated above can be used.

*Example IV*

A mixture of 50 parts of bis(4-tolyl)chlorothionophosphate, 100 parts of bentonite, and 0.5 part of calcium dodecylbenzene sulfonate is treated in a ball mill for a period of one-half hour. At the end of this period the mixture is screened to pass a 100-mesh sieve. This 50 weight percent wettable powder formulation is further treated to from a suspension suitable for application by adding with agitation 100 parts of the wettable powder to 1000 parts of water. The resulting aqueous suspension of the solid surface-contacting agent and defoliant is suitable for spraying directly upon crops.

*Example V*

An emulsifiable concentrate is prepared by treating 10 parts of 4-T-butylphenyldichlorothionophosphate with 65 parts of cyclohexanone, 20 parts of xylene, and 5 parts of sodium alkylaryl sulfonate. This concentrate is further diluted with water so as to contain one percent active ingredient to make an effective defoliant formulation. Typical of the thionophosphates which can be so formulated to provide efficient defoliating formulations include di(methylphenyl) - chlorothionophosphate, di(3-chloro - 4 - methylphenyl)chlorothionophosphate, 2,4-dimethylphenyldichlorothionophosphate, 2-naphthyldichlorothionophosphate and the like.

*Example VI*

An oil concentrate is prepared by dissolving 100 parts of 4-ethyl-1-naphthyldichlorothionophosphate in 90 parts of xylene containing 10 parts of a commercially available blend of a polyalcohol carboxylic acid ester and a sulfonated oil. This clear non-phytotoxic defoliant concentrate can be directly added to water with only mild agitation to prepare dilute formulations effective for application to the field crop.

*Example VII*

To 100 parts of Enjay oil was added finely ground 4-octylphenyldichlorothionophosphate in the amount of 5 parts. This 5 percent mixture of active ingredient was agitated until solution occurred. A composition suitable for application was made from this concentrate by further diluting with the oil to a final concentration of 0.5 weight percent.

Equally good oil formulations of di(1-naphthyl)chlorothionophosphate, di(3-tolyl)chlorothionophosphate, di(4-octylphenyl)chlorothionophosphate, phenyl dichlorothionophosphate, 2-chlorophenyldichlorothionophosphate and the like were prepared by the above method.

For certain applications defoliant compositions of our invention are employed in the form of surface contacting suspensions. In general such suspensions are prepared by one of the following methods: A concentrated oil solution of the active ingredient is prepared and this is added to water containing a dispersing agent; a solution of one of our defoliants in a water soluble solvent is prepared which is thereupon added to water containing a dispersing agent or a water suspension of the defoliant is prepared and added to an oil in the presence of a dispersing agent. Thus either a water and oil emulsion or a solid dispersion of the active ingredient can be prepared. Examples of typical dispersing agents which can be employed in forming dispersions include salts of the alkyl and alkylaryl sulfonates, such as Du Pont MP–189 and Nacconol-NR, alkyl sulfates, such as Dreft, alkylamide sulfonates, such as Igepon-T, the alkylaryl polyether alcohols, such as Triton X–100, the fatty acid esters of polyhydric alcohols, such as Span, the ethylene oxide addition products of such esters, as for example Tween, and the addition products of long-chain mercaptans and ethylene oxide, such as Sharples' Non-Ionic–218. Still other surface-active agents can be employed, for example that referred to Emulphor Ag Oil Soluble, the above merely showing a representative list of the more common materials.

*Example VIII*

A formulation of bis(3-chlorophenyl)chlorothionophosphate was prepared by finely grinding 10 parts of this material with 90 parts of water containing 0.1 part of Tween–80. Ten parts of this aqueous suspension was thereupon added to 200 parts of T–942–B to form a final formulation consisting of 0.5 weight percent of thionophosphate in an oil-in-water emulsion containing a surface active agent.

*Example IX*

Cotton variety Deltapine 15 was grown under irrigation. Conditions for growth were good and the cotton produced between about 1.5 to 2.0 bales per acre. Aqueous defoliant compositions of diphenylchlorothionophosphate were applied to the crop from a tractor mounted spray delivering 28 gallons per acre. The defoliation achieved, employing the active ingredient at such concentration that its dosage rate was 2 pounds per acre, was 74.0 percent. By increasing the concentration to 6 pounds per acre 93.4 percent defoliation was achieved. Similar results under comparable field conditions and methods of application were obtained with di(o-cresyl)-chlorothionophosphate, m-cresyldichlorothionophosphate, bis(m-dimethylphenyl)chlorothionophosphate and the like.

Having fully described the invention and best manner of preparation thereof, what is claimed is:

I claim:

1. A composition for defoliating agricultural crops prior to harvesting comprising an effective amount of an aryl chlorothionophosphate having the formula $$ROPCl_2$$
$$\overset{S}{\|}$$

where R is an aryl radical in combination with a surface active agent.

2. A method of defoliating cotton which comprises applying thereto during the period when the plant contains bolls a O,O-diarylmonochlorothionophosphate having the formula $$(RO)_2PCl$$
$$\overset{S}{\|}$$

where R is an aryl group, in a dispersing medium containing a surface active agent at the rate of between about 0.5 to 3 pounds of the diarylmonochlorothionophosphate per acre of cotton.

3. The method of claim 2 wherein the diarylmonochlorothionophosphate is O,O-diphenylchlorothionophosphate.

4. The method of claim 2 wherein the diarylmonochlorothionophosphate is O,O-dicresylchlorothionophosphate.

5. The method of claim 4 wherein the O,O-dicresylchlorothionophosphate is O,O-diorthocresylchlorothionophosphate.

6. The method of defoliating agricultural crops prior to harvesting which comprises applying thereto in an amount sufficient to effect defoliation a composition containing a chlorothionophosphate having the formula $$(RO)_nPCl_{(3-n)}$$
$$\overset{S}{\|}$$

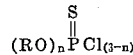

where R is a member of the group consisting of chloroaryl and aryl radicals and $n$ is a whole number from 1 to 2.

7. A method according to claim 6 wherein the chlorothionophosphate is O,O-diphenylchlorothionophosphate.

8. The method of claim 6 wherein the chlorothionophosphate is O,O-diorthocresylchlorothionophosphate.

9. A method of defoliating cotton which comprises applying thereto during the period when the plant contains bolls O,O-diphenylchlorothionophosphate at a rate of between about 0.5 to 6 pounds per acre of cotton.

10. A method of defoliating cotton which comprises applying thereto during the period when the plant contains bolls O,O-diorthocresylchlorothionophosphate at the rate of between about 0.5 to 6 pounds per acre of cotton.

References Cited in the file of this patent

UNITED STATES PATENTS

| | | |
|---|---|---|
| 2,143,639 | Caprio | Jan. 10, 1939 |
| 2,269,396 | Jayne | Jan. 6, 1942 |
| 2,503,390 | Jelinek | Apr. 11, 1950 |
| 2,520,393 | Fletcher | Aug. 29, 1950 |
| 2,692,893 | Hechenbleikner | Oct. 26, 1954 |
| 2,730,541 | Dye | Jan. 10, 1956 |
| 2,799,696 | Tolkmith et al. | July 17, 1957 |
| 2,836,534 | Birum | May 27, 1958 |
| 2,836,535 | Birum | May 27, 1958 |
| 2,841,486 | Osborn et al. | July 1, 1958 |